United States Patent
Suetsugu et al.

(10) Patent No.: US 9,677,004 B2
(45) Date of Patent: Jun. 13, 2017

(54) METHOD AND APPARATUS FOR ADJUSTING PITCH MATERIAL

(71) Applicant: TOYOTA BOSHOKU KABUSHIKI KAISHA, Aichi-ken (JP)

(72) Inventors: Yuuichi Suetsugu, Toyota (JP); Hiroshi Koyama, Tajimi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 254 days.

(21) Appl. No.: 14/539,000

(22) Filed: Nov. 12, 2014

(65) Prior Publication Data

US 2015/0166896 A1    Jun. 18, 2015

(30) Foreign Application Priority Data

Nov. 18, 2013   (JP) ................................. 2013-238103

(51) Int. Cl.
  *C10C 3/04*   (2006.01)
  *B01J 6/00*   (2006.01)

(52) U.S. Cl.
  CPC ................. *C10C 3/04* (2013.01); *B01J 6/005* (2013.01)

(58) Field of Classification Search
  CPC ..................................... C01C 3/04; B01J 6/005
  See application file for complete search history.

(56) References Cited

U.S. PATENT DOCUMENTS

| 1,404,435 A | * | 1/1922 | Gevers-Orban | .......... C10C 3/04 |
| | | | | 196/124 |
| 2013/0008828 A1 | * | 1/2013 | Bran | ................... B01F 3/04588 |
| | | | | 208/133 |
| 2013/0072518 A1 | | 3/2013 | Nirogi et al. | |

FOREIGN PATENT DOCUMENTS

| JP | 43-4490 | 2/1968 |
| JP | 61-31157 | 7/1986 |
| JP | 05-38798 | 6/1993 |
| JP | 9-143475 | 6/1997 |
| JP | 2013-516504 | 5/2013 |

OTHER PUBLICATIONS

Office Action issued in Japan Counterpart Patent Appl. No. 2013-238103, dated Nov. 22, 2016, along with an English translation thereof.

* cited by examiner

*Primary Examiner* — Randy Boyer
*Assistant Examiner* — Juan Valencia
(74) *Attorney, Agent, or Firm* — Greenblum & Bernstein, P.L.C.

(57) ABSTRACT

A method for adjusting the softening point of a pitch material includes heating the pitch material to form molten pitch material, and rising the softening point of the pitch material by moving a plurality of movable members so that the movable members repetitively move at least some of the molten pitch material out of a liquid level of the molten pitch material and back to the molten pitch material.

4 Claims, 3 Drawing Sheets

METHOD AND APPARATUS FOR ADJUSTING PITCH MATERIAL

BACKGROUND OF THE INVENTION

The present invention relates to a method and an apparatus for adjusting the softening point of a pitch (hereinafter referred to as the "pitch material") such as coal tar pitch or petroleum pitch.

When spinning carbon fibers from a pitch material, it is desirable that the pitch material have a high softening point to improve the spinning properties and smoothen post-spinning processing, such as when processing the spun pitch material to be infusible.

Japanese Laid-Open Patent Publication No. 9-143475 discloses an example of a method for adjusting the softening point of a pitch material. In this method, 500 g of a pitch material having a softening point of 125° C. is placed in a one-liter autoclave. Then, an oxidizing gas such as air is blown into the autoclave at a rate of five liters per minute while agitating and heating the pitch material at a temperature of 350° C. for two hours. This produces a pitch material having a softening point of 296.3° C.

However, the method described in the above publication requires an autoclave, which is a relatively costly apparatus, and a troublesome process of blowing oxidizing gas into the pitch material.

SUMMARY OF THE INVENTION

One aspect of the present invention is a method for adjusting the softening point of a pitch material. The method includes heating the pitch material to form molten pitch material, and rising the softening point of the pitch material by moving a plurality of movable members so that the movable members repetitively move at least some of the molten pitch material out of a liquid level of the molten pitch material and back to the molten pitch material.

A further aspect of the present invention is an apparatus for adjusting the softening point of a pitch material. The apparatus is provided with a pitch tank including a heating member. The pitch tank contains molten pitch material. A plurality of movable members are arranged on an upper portion of the pitch tank. The movable members are configured to be moved so that the movable members repetitively move at least some of the molten pitch material out of a liquid level of the molten pitch material and back to the molten pitch material.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

A first embodiment of a method and an apparatus for adjusting the softening point of a pitch material will now be described with reference to FIGS. 1 and 2.

Figure 1:
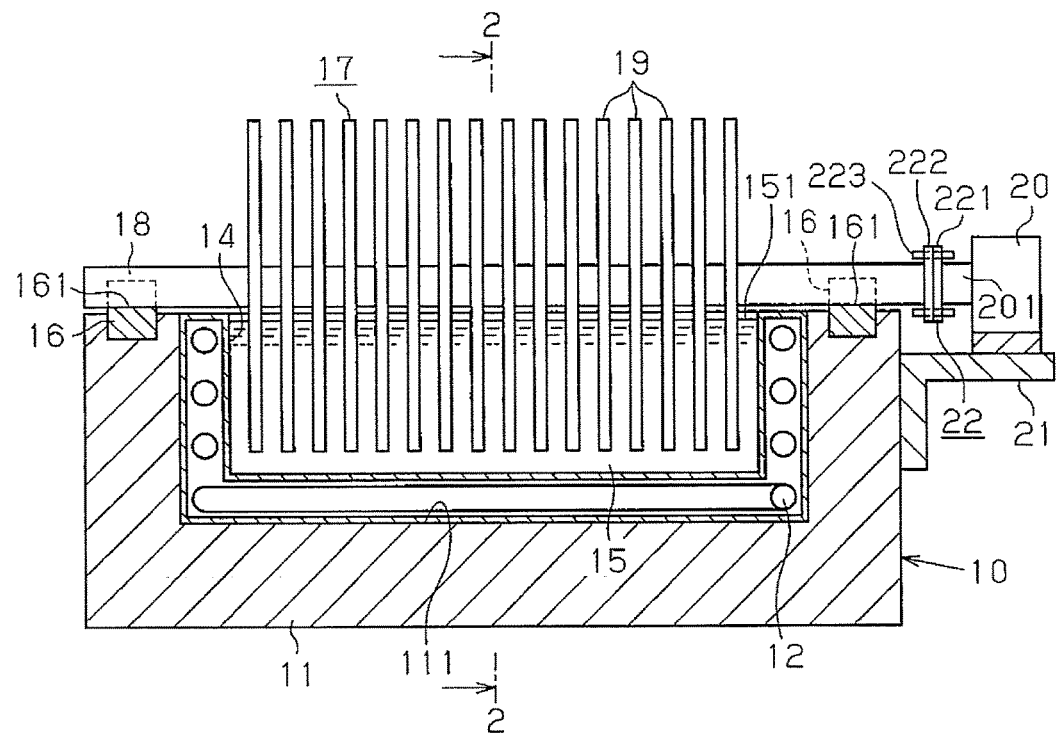
FIG. 1 is a cross-sectional view showing a first embodiment of an apparatus for adjusting the softening point of a pitch material.
Figure 2:
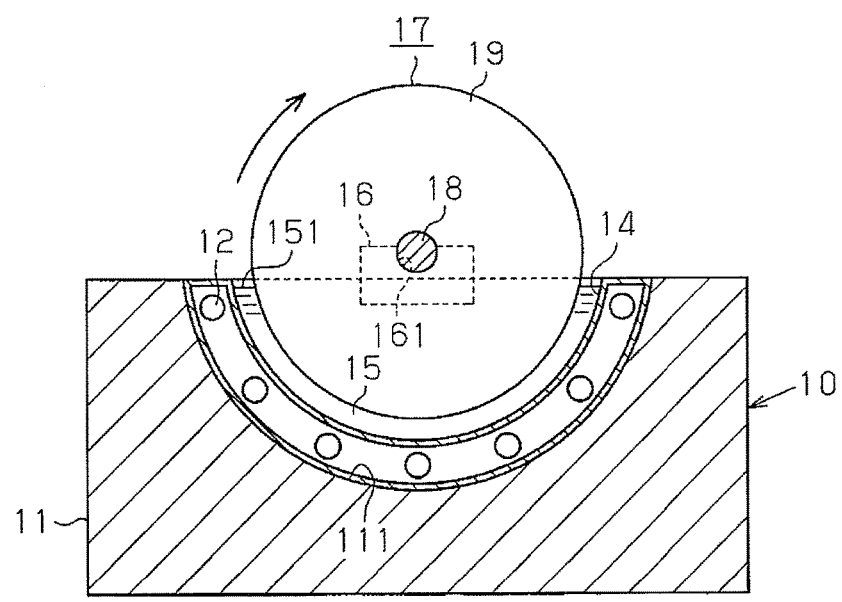
FIG. 2 is a cross-sectional view taken along line 2-2 in FIG. 1.

As shown in FIGS. 1 and 2, the apparatus includes a pitch tank 10. The pitch tank 10 includes an outer tank 11 and an inner tank 14. The outer tank 11 includes a recess 111, which has a substantially semicircular cross-section and is open at the upper side. The inner tank 14 is semi-cylindrical and received in the recess 111 of the outer tank 11. The inner tank 14 is separable from the outer tank 11. Further, the inner tank 14 has a hollow wall that accommodates a heater 12, which serves as a heating member. The inner tank 14 contains a pitch material 15 that is heated and molten by the heater 12.

Two bearings 16 are respectively arranged on the two ends of the upper surface of the outer tank 11. Each bearing 16 includes a U-shaped or V-shaped groove 161. A movable unit 17 is supported by the grooves 161 of the two bearings 16. The movable unit 17, which is rotatable and separable from the grooves 161, includes a shaft 18 and plate-like movable members fixed to the shaft 18. For example, the movable members may be disks 19. The disks 19 are parallel to one another and arranged at equal intervals on the shaft 18. The shaft 18 extends through the center of each disk 19. The shaft 18 is supported by the grooves 161 of the two bearings 16 so that the shaft 18 is located proximate to and extends parallel to the liquid level 151 of the pitch material 15 in the inner tank 14. The inner tank 14 has an arcuate inner surface that is proximate to and concentric with the circumferential surface of each disk 19 when the movable unit 17 is mounted on the pitch tank 10. Rotation of the movable unit 17 about the shaft 18 rotates each disk 19 between the upper side (atmosphere) and the lower side of the liquid level 151 of the pitch material 15 in the inner tank 14. Each disk 19 rotates in a direction intersecting the thickness direction of the disk 19. The inner tank 14, the shaft 18, and the disks 19 may be formed from stainless steel.

A bracket 21 is coupled to one side of the outer tank 11 to support a motor 20 that rotates the movable unit 17. A coupling 22 is located between an end of a motor shaft 201 and an end of the shaft 18 of the movable unit 17. The coupling 22 includes a driving connector 221, which is fixed to the motor shaft 201, and a driven connector 222, which is fixed to the shaft 18 of the movable unit 17. Removable pins 223 join the two connectors 221 and 222 to couple the motor shaft 201 and the shaft 18 of the movable unit 17 in a separable manner.

A method for adjusting the softening point of the pitch material with the apparatus described above will now be described.

The pitch material 15 is placed in the inner tank 14 and heated and molten by the heater 12. The temperature of the pitch material 15 in the inner tank 14 is approximately 250° C. to approximately 300° C. Under this condition, when the motor 20 rotates the movable unit 17, the disks 19 continuously rotate between the upper side and the lower side of the liquid level 151 of the pitch material 15 in the inner tank 14. This agitates the pitch material 15. In this case, the rotation speed of the movable unit 17 is approximately 10 to 30 rotations per minute. Some of the molten pitch material 15 adheres to the portion of each disk 19 located in the molten pitch material 15. When such portion of the disk 19 is moved out of the molten pitch material 15 and into the atmosphere by the rotation of the movable unit 17, the pitch material 15 adhered to the surface of the disk 19 cools and solidifies while reacting with the oxygen in the atmosphere. Further rotation of the movable unit 17 returns this portion of the disk 19 to the molten pitch material 15. Thus, the pitch material 15 on the disk 19 melts again. The repetition of such motion gradually draws oxygen from the atmosphere into the pitch material 15 and raises the softening point of the pitch material 15. When the softening point of the pitch material rises, the pitch material becomes solid and gradually accumulates on the surface of each disk 19.

The adjustment of the softening point of the pitch material 15 is completed when most of the pitch material 15 in the inner tank 14 becomes adhered to the disks 19. Then, the pins 223 are manually unfastened from the coupling 22 to separate the shaft 18 of the movable unit 17 and the motor shaft 201.

The movable unit 17 is then separated from the upper portion of the outer tank 11. The pitch material 15 of which the softening point has been adjusted is removed and collected from the surface of each disk 19. Further, the inner tank 14 is separated from the recess 111 of the outer tank 11, and the residual pitch material 15, of which softening point has been adjusted, is removed and collected from the inner surface of the inner tank 14.

In one example, a pitch material 15 having a softening point of 110° C. was placed in the inner tank 14. The pitch material 15 was heated by the heater 12 and kept molten at a temperature between 270° C. and 280° C. Under this situation, the motor 20 rotated the movable unit 17 for two hours. This obtained the pitch material 15 of which the softening point had been adjusted to 200° C. or higher. The high softening point pitch material 15 thus obtained is crushed, reheated, and used for spinning.

The above embodiment has the following advantages.

(1) The disks 19, which serve as movable members, partially move the pitch material 15 between the upper and lower sides of the liquid level 151 of the molten pitch material 15. That is, the disks 19 move the pitch material 15 that is adhered to each disk 19 out of and into the molten pitch material 15. This motion gradually draws oxygen from the atmosphere into the pitch material 15 and raises the softening point of the pitch material 15. In this manner, the present embodiment differs from the prior art in that there is no need to perform a burdensome process such as agitating a pitch material in a costly instrument such as an autoclave while blowing oxidizing gas into the pitch material. Further, in the prior art, it is difficult to uniformly blowing oxidizing gas into the pitch material and uniformly agitate the pitch material. When such uniformity cannot be achieved, it becomes difficult to obtain a pitch material having a high softening point. In contrast, the present embodiment uniformly and effectively raises the softening point of the pitch material 15 without the need to perform a burdensome process such as blowing oxidizing gas into the pitch material while using a costly instrument like an autoclave.

(2) The disks 19 are rotated about the shaft 18. In other words, each disk 19 is rotated in a direction intersecting the thickness direction of the disk 19. This moves the pitch material 15 that adheres to the disks 19 into and out of the molten pitch material 15, that is, between the upper and lower sides of the liquid level 151 of the pitch material 15, to raise the softening point of the pitch material 15. Thus, the pitch material 15 is not excessively agitated, and subtle bubbles enter the pitch material 15. This limits the degradation of the pitch material 15.

(3) To raise the softening point of the pitch material 15, each disk 19 is simply rotated at a relatively slow speed in a direction intersecting the thickness direction of the disk 19 between the upper and lower sides of the liquid level 151 of the molten pitch material 15. Thus, there is no need for the motor to output high power when rotating the disks 19. This allows for a reduction in the running cost used to adjust the softening point of the pitch material 15.

(4) The main elements of the apparatus are only the pitch tank 10, which is provided with the motor 20, and the movable unit 17. Thus, the apparatus includes few components and has a simple structure.

(5) The inner surface of the inner tank 14 of the pitch tank 10 is proximate to and concentric with the circumferential surface of each disk 19. Thus, the process for raising the softening point can be efficiently performed on the entire pitch material 15 in the inner tank 14.

(6) The disks 19 are arranged parallel to and spaced apart from one another on the shaft 18. This increases the entire surface area of the disks 19, which is the sum of the surface area of each disk 19. Thus, the rotation of the disks 19 allows for the pitch material 15 to be efficiently adjusted to a high softening point within a short period of time.

Second Embodiment

A second embodiment of a method and an apparatus for adjusting the softening point of a pitch material will now be described focusing on differences from the first embodiment.

Figure 3:
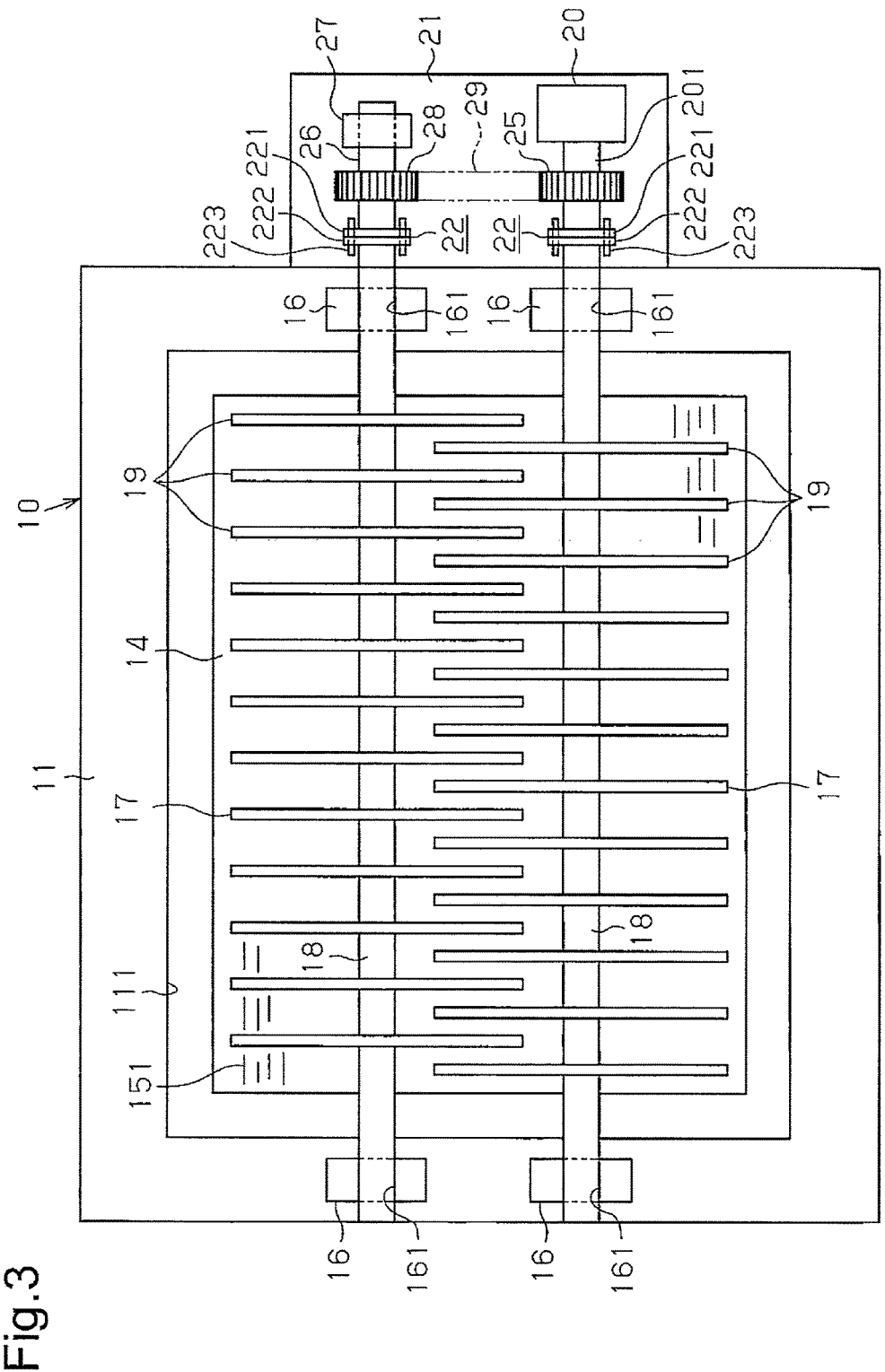
FIG. 3 is a plan view showing a second embodiment of an apparatus for adjusting the softening point of a pitch material.
Figure 4:
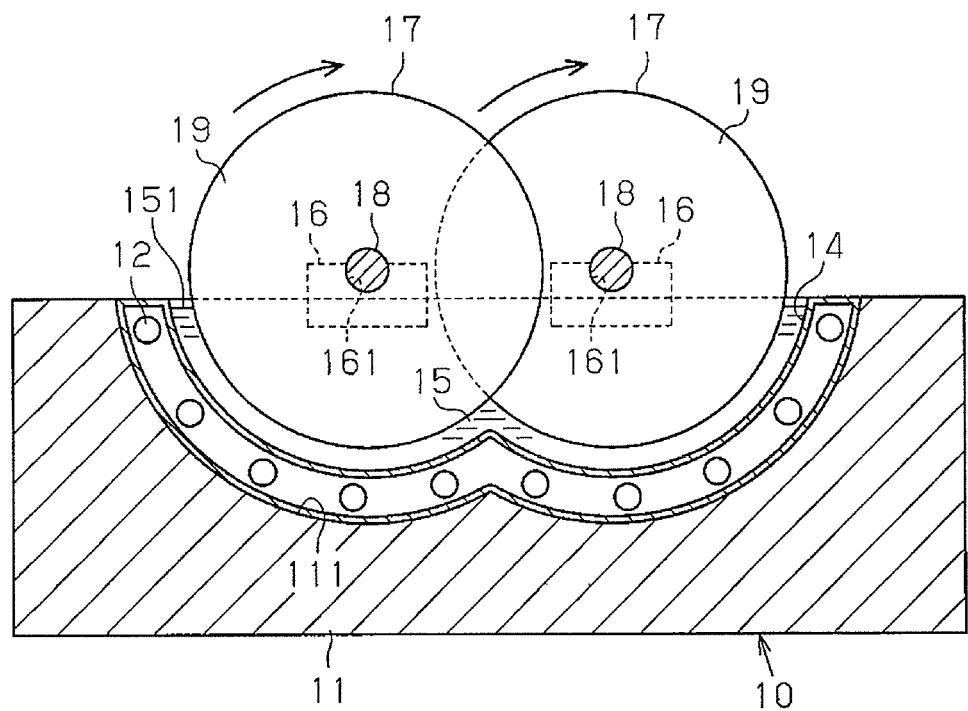
FIG. 4 is a cross-sectional view of the apparatus shown in FIG. 3.

In the second embodiment, as shown in FIGS. 3 and 4, a plurality of (two in this embodiment) movable units 17 are arranged next to each other on the outer tank 11. Each movable unit 17 is supported by two bearings 16 and includes a shaft 18 and disks 19. The disks 19 of one of the movable units 17 and the disks 19 of the other one of the movable units 17 are alternately arranged. A coupling 22 couples the shaft 18 of one of the movable units 17 to a motor shaft 201 of a motor 20 in a separable manner. A driving sprocket 25 is fixed to the motor shaft 201.

A further coupling 22 couples the shaft 18 of the other movable unit 17 to a cooperative shaft 26 in a separable manner. The cooperative shaft 26 is rotatably supported by a bearing 27 on the bracket 21, which supports the motor 20. A driven sprocket 28 is fixed to the cooperative shaft 26. A chain 29 runs around the driving sprocket 25 and the driven sprocket 28. The sprockets 25 and 28 may be gears, and the chain 29 may be a belt. The motor 20 generates rotation that integrally rotates the two movable units 17 with the chain 29 to adjust the softening point of the pitch material 15. The two shafts 18 may be coupled to different motors 20 to separately control the rotation of the shafts 18.

In addition to advantages (1) to (6) of the first embodiment, the second embodiment has the advantage described below.

(7) The use of the plurality of movable units 17 allows for a large amount of the pitch material 15 to be adjusted to a high softening point within a short period.

It should be apparent to those skilled in the art that the present invention may be embodied in many other specific forms without departing from the spirit or scope of the invention. Particularly, it should be understood that the present invention may be embodied in the following forms.

The movable members may be rods or polygonal plates. In such cases, the movable members may be linearly moved between the upper and lower sides of the liquid level 151 of the pitch material 15.

The disks 19 may be corrugated to increase the surface area.

The present examples and embodiments are to be considered as illustrative and not restrictive, and the invention is not to be limited to the details given herein, but may be modified within the scope and equivalence of the appended claims.

The invention claimed is:

1. A method for adjusting the softening point of a pitch material, the method comprising: heating the pitch material to form molten pitch material; and raising the softening point of the pitch material by rotating a plurality of disks about an axis extending through the center of each disk so that the disks repetitively move at least some of the molten pitch material out of a liquid level of the molten pitch material and back to the molten pitch material, wherein the method is performed in an open atmosphere.

2. The method according to claim 1, wherein the disks are plate-like, and each disk is moved in a direction intersecting a thickness direction of the disk.

3. The method according to claim 1, wherein the disks are rotated about the axis extending along the liquid level of the molten pitch material.

4. The method according to claim 3, wherein the disks are arranged parallel to each other on the axis.

* * * * *